(12) United States Patent
Greenwald et al.

(10) Patent No.: US 10,284,673 B2
(45) Date of Patent: May 7, 2019

(54) INTERFACE FOR A CLIENT OF A NETWORK DEVICE

(71) Applicant: Arista Networks, Inc., Santa Clara, CA (US)

(72) Inventors: Michael Greenwald, Berkeley, CA (US); Stephen Schleimer, Campbell, CA (US)

(73) Assignee: Arista Networks, Inc., Santa Clara, CA (US)

( * ) Notice: Subject to any disclaimer, the term of this patent is extended or adjusted under 35 U.S.C. 154(b) by 106 days.

(21) Appl. No.: 15/273,936

(22) Filed: Sep. 23, 2016

(65) Prior Publication Data

US 2017/0289295 A1    Oct. 5, 2017

Related U.S. Application Data

(60) Provisional application No. 62/317,276, filed on Apr. 1, 2016.

(51) Int. Cl.
*H04L 29/08* (2006.01)
*H04L 29/06* (2006.01)

(52) U.S. Cl.
CPC ...... *H04L 67/2842* (2013.01); *H04L 67/1097* (2013.01)

(58) Field of Classification Search
CPC . H04L 67/2842; H04L 67/1097; H04L 67/10; G06Q 10/06311
USPC ........................................ 709/217, 232, 235
See application file for complete search history.

(56) References Cited

U.S. PATENT DOCUMENTS

| | | | |
|---|---|---|---|
| 6,366,915 B1 | 4/2002 | Rubert et al. | |
| 6,487,560 B1* | 11/2002 | LaRue | G06F 17/30 707/203 |
| 6,502,093 B1* | 12/2002 | Bhatt | G06F 16/24568 |
| 6,732,124 B1 | 5/2004 | Koseki et al. | |
| 6,834,276 B1* | 12/2004 | Jensen | G06F 16/9558 |
| 6,910,070 B1* | 6/2005 | Mishra | G06F 13/00 709/224 |
| 7,177,859 B2* | 2/2007 | Pather | G06F 9/542 |
| 7,360,202 B1 | 4/2008 | Seshadri et al. | |
| 7,698,276 B2 | 4/2010 | Seshadri et al. | |
| 8,150,959 B1* | 4/2012 | Bezdicek | G05B 23/027 709/224 |
| 8,631,034 B1 | 1/2014 | Peloski | |

(Continued)

OTHER PUBLICATIONS

Allan et al.; Record Architecture for a Relational Database Management System Supporting Null Values and Extensible Tables; IP.com; 2005.

(Continued)

*Primary Examiner* — David R Lazaro
*Assistant Examiner* — Berhanu Shitayewoldetadik
(74) *Attorney, Agent, or Firm* — Chamberlain, Hrdlicka, White, Williams & Aughtry

(57) ABSTRACT

A network device includes an external subscription table, an interpreter, and a state machine. The external subscription table includes a subscription associated with a client. The interpreter is programmed to obtain the subscription; generate an entity, based on the subscription, that produces an output; and notify the client of the output. The state machine is programmed to send the output to the client based on the subscription.

20 Claims, 16 Drawing Sheets

(56) References Cited

U.S. PATENT DOCUMENTS

| | | | | |
|---|---|---|---|---|
| 8,914,404 | B1* | 12/2014 | Kim | G06F 16/2358 707/769 |
| 9,009,289 | B1 | 4/2015 | Jacob | |
| 2002/0004736 | A1* | 1/2002 | Roundtree | G06Q 10/04 705/7.32 |
| 2002/0007363 | A1 | 1/2002 | Vaitzblit | |
| 2003/0018644 | A1* | 1/2003 | Bala | G06F 7/00 707/100 |
| 2004/0098425 | A1 | 5/2004 | Wiss et al. | |
| 2005/0165731 | A1* | 7/2005 | Funk | G05B 15/02 |
| 2007/0050392 | A1* | 3/2007 | Shukla | G06F 16/2358 |
| 2007/0266331 | A1 | 11/2007 | Bicker et al. | |
| 2008/0104008 | A1* | 5/2008 | Brantley | G06F 16/20 |
| 2008/0162849 | A1 | 7/2008 | Savagaonkar et al. | |
| 2008/0165943 | A1* | 7/2008 | Gonzalez | H04M 3/42 379/201.12 |
| 2008/0208672 | A1* | 8/2008 | Van Riel | G06Q 10/06311 705/7.13 |
| 2008/0208806 | A1* | 8/2008 | Dalfo | H04L 67/1095 |
| 2008/0300706 | A1* | 12/2008 | Ruml | G06Q 10/04 700/100 |
| 2009/0024752 | A1* | 1/2009 | Shitomi | G06F 3/0605 709/230 |
| 2009/0063381 | A1* | 3/2009 | Chan | G06Q 10/10 706/47 |
| 2009/0234680 | A1* | 9/2009 | Newton | G06Q 10/02 705/5 |
| 2009/0300528 | A1* | 12/2009 | Stambaugh | G06F 3/04817 715/764 |
| 2010/0161555 | A1* | 2/2010 | Nica | G06F 17/30 707/624 |
| 2010/0281102 | A1 | 11/2010 | Chinta et al. | |
| 2011/0055231 | A1 | 3/2011 | Huck et al. | |
| 2011/0214050 | A1* | 9/2011 | Stambaugh | G06F 3/04817 715/234 |
| 2011/0314047 | A1* | 12/2011 | Koronthaly | G06F 13/00 707/769 |
| 2011/0320620 | A1* | 12/2011 | Cutler | H04L 63/102 709/229 |
| 2012/0005220 | A1 | 1/2012 | Schindlauer et al. | |
| 2012/0023077 | A1 | 1/2012 | Kann et al. | |
| 2012/0112893 | A1* | 5/2012 | Bezdicek | G05B 23/027 340/286.02 |
| 2012/0190325 | A1 | 7/2012 | Abu-Hakima et al. | |
| 2012/0310906 | A1* | 12/2012 | Miller | G06F 17/5004 707/695 |
| 2013/0041781 | A1* | 2/2013 | Freydberg | G06Q 30/06 705/27.1 |
| 2013/0150007 | A1* | 6/2013 | Wang | H04W 4/18 455/414.1 |
| 2013/0188515 | A1* | 7/2013 | Pinheiro | H04L 67/16 370/254 |
| 2014/0095535 | A1 | 4/2014 | Deshmukh et al. | |
| 2014/0310258 | A1* | 10/2014 | Tian | G06F 17/30463 707/718 |
| 2014/0317084 | A1 | 10/2014 | Chaudhry et al. | |
| 2015/0009818 | A1* | 1/2015 | Xiao | H04L 12/815 370/230.1 |
| 2015/0019701 | A1* | 1/2015 | Marvis | H04L 41/50 709/223 |
| 2015/0149631 | A1 | 5/2015 | Lissack | |
| 2015/0193477 | A1 | 7/2015 | Dumant et al. | |
| 2015/0207794 | A1* | 7/2015 | Lee | H04L 61/1541 709/225 |
| 2016/0098450 | A1 | 4/2016 | Tandon et al. | |
| 2017/0063948 | A1* | 3/2017 | Shroff | H04L 63/10 |
| 2017/0177697 | A1 | 6/2017 | Lee et al. | |

OTHER PUBLICATIONS

IEEE 100—The Authoritative Dictionary of IEEE Standard Terms; Published by Standards Information Network, IEEE Press; 7th Edition; pp. 1133-1134; 2000.

What is a Database Schema? Published by Database Guide Jun. 6, 2016.

\* cited by examiner

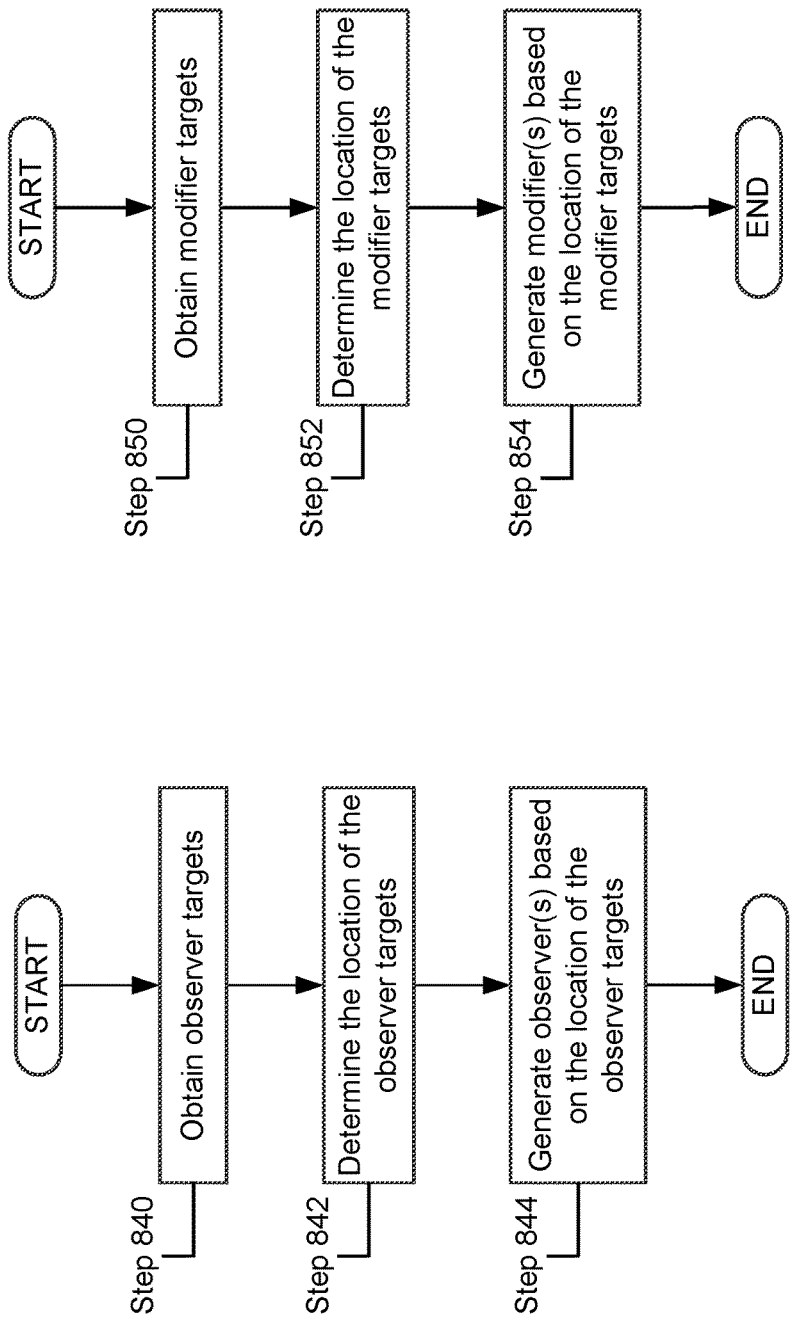

INTERFACE FOR A CLIENT OF A NETWORK DEVICE

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network device in accordance with embodiments of the invention includes an external subscription table, an interpreter, and a state machine. The external subscription table includes a subscription associated with a client. The interpreter is programmed to obtain the subscription; generate an entity, based on the subscription, that produces an output; and notify the client of the output. The state machine is programmed to send the output to the client based on the subscription In one aspect, a method of operating a network device in accordance with embodiments of the invention includes obtaining, by an interpreter of the network device, a subscription associated with a client; generating, by the interpreter, an entity that produces an output; sending, by a state machine of the network device, the output to the client based on the subscription.

In one aspect, a method of operating a client in accordance with embodiments of the invention includes establishing a connection with a network device; receiving a database planner in response to establishing the connection; and sending a subscription request to the network device based on, at least in part, the database planner. The subscription request specifies a table of a database of the network device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8E shows a flowchart of a second method of generating observers in accordance with one or more embodiments of the invention.

FIG. 8F shows a flowchart of a second method of generating modifiers in accordance with one or more embodiments of the invention.

DETAILED DESCRIPTION

Figure 1A:
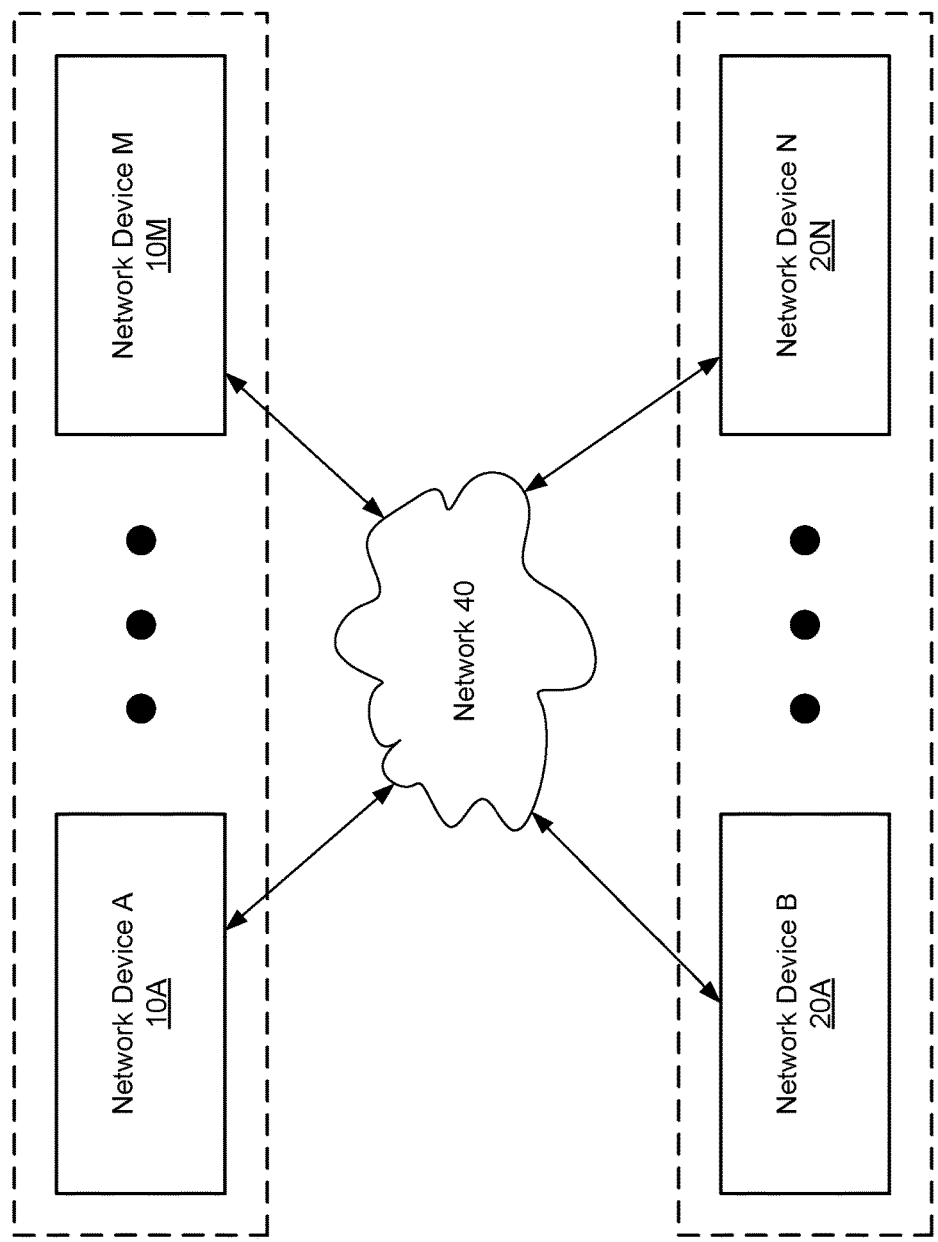
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be an accessibility of another network device. The stored information may be other information without departing from the invention.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device.

In one or more embodiments of the invention, the network device may include one or more state machines. The state machines may be programmed to notify entities of changes to entries of the database based on a subscription table. In one or more embodiments of the invention, the subscription table may be an external subscription table. The subscription table may specify entries of the database and entities that which to be notified of changes to the entries.

The network device may include a query service manager (QSM). The QSM may generate and/or manage query service instances (QSI)s that operate on information stored in the database. QSIs may be generated in response to requests from other entities. In one or more embodiments of the invention, the other entities may be agents executing on the network device or agents executing on other network devices.

Each instance of a QSI may include an input table, a query, and may generate an output. A QSI may operate on entries of the input table to produce the output. In one or more embodiments of the invention, the QSI may generate an output in response to a change in an input table of the QSI. In one or more embodiments of the invention, the QSI may generate an output after one or more predetermined changes to the input table have occurred. In one or more embodiments of the invention, the QSI may produce an output at a predetermined time, e.g., periodically or at one or more predetermined times.

The entries of input tables of a QSI may be generated by observers. Observers may monitor entries of the database and/or output tables of other QSIs and propagate changes to the database and/or output tables to input tables associated with the observer. In one or more embodiments of the invention, observers may also propagate changes to entries of the database to one or more agents of the network device.

In one or more embodiments of the invention, the output produced by the query of a QSI may be propagated to an output table by a modifier. Modifiers may monitor queries of QSIs and propagate the output of the queries to output tables in response to changes in the output of the query. In one or more embodiments of the invention, the output table may be a portion of the database, e.g., a table of the database or entries of a table of the database.

In one or more embodiments of the invention, the network device may include an interpreter. The interpreter may be programmed to generate entities based on entries of the subscription table and notify a client associated with the entries of the subscription table when an output is generated by the entities. In one or more embodiments of the invention, the entities may be observers, modifiers, and/or QSIs.

FIG. 1A shows an example of a network in accordance with one or more embodiments of the invention. The example network shown in FIG. 1 includes network devices (10A-10N) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet. In another embodiment of the invention, the network (40) may be an intranet. The intranet may be connected to the Internet.

Figure 1B:
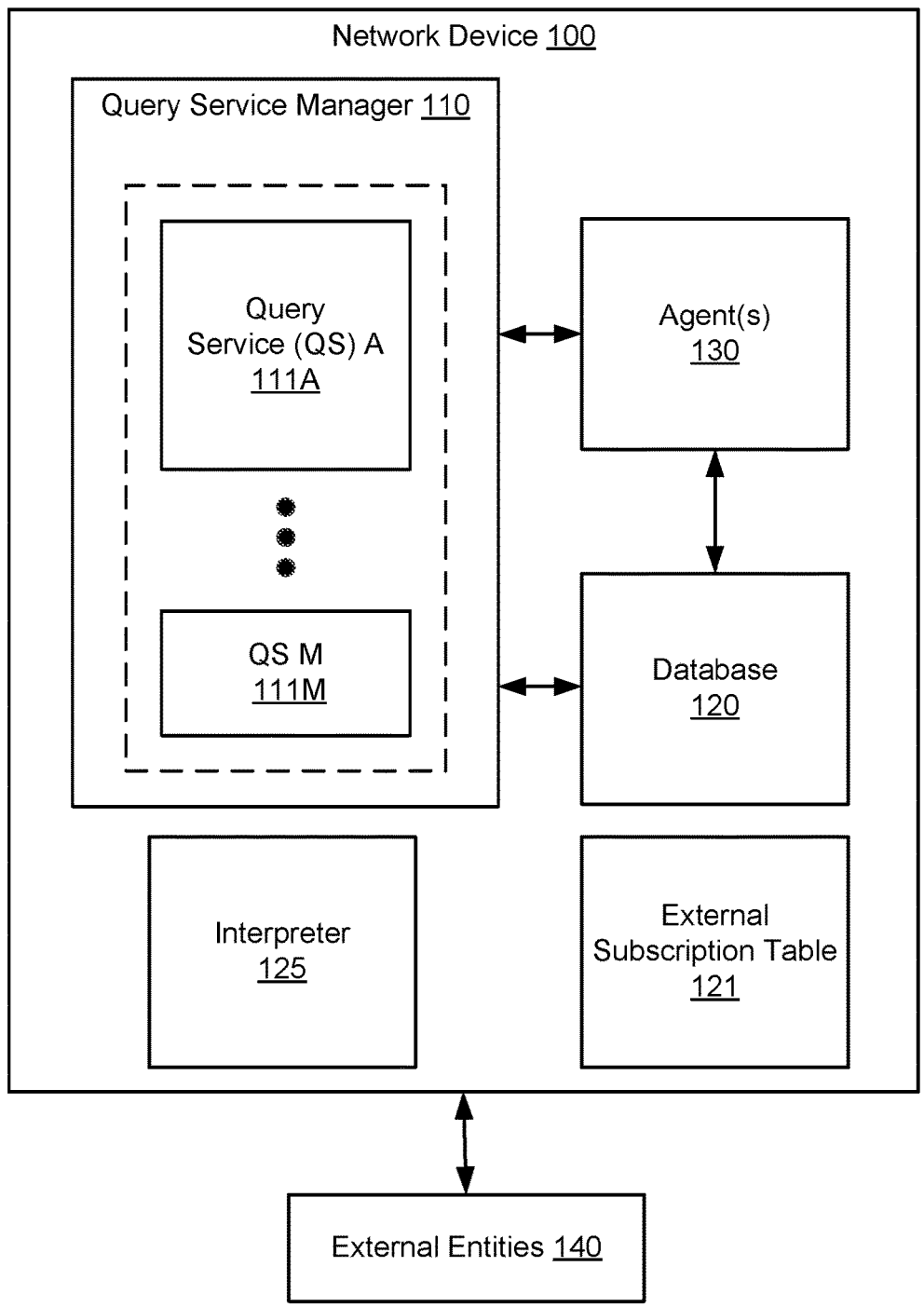
FIG. 1B shows a diagram of a network device in accordance with one or more embodiments of the invention.

FIG. 1B shows a network device (100) in accordance with one or more embodiments of the invention. The network device (100) may be programmed to store information in a database (120) and generate outputs based on the information stored in the database (120) by one or more QSIs.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-10.

The network device (100) may include a QSM (110), one or more query services (111A-111M), a database (120), an external subscription table (121), an interpreter (125), and a one or more agents (130). The network device (100) may be operably connected to one or more entities (140). The entities (140) may be, for example, other network devices, servers, or computing devices accessible by a network. Agents (130) may be executing on the other entities (140). Each of the components of the network device (100) is described below.

The network device (100) may include a database (120). The database (120) may be a managed storage database that controls read and/or write access to information stored in the database. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. The interaction of observers and modifiers with the database are described in greater detail with respect to FIGS. 6-7.

Figure 2:
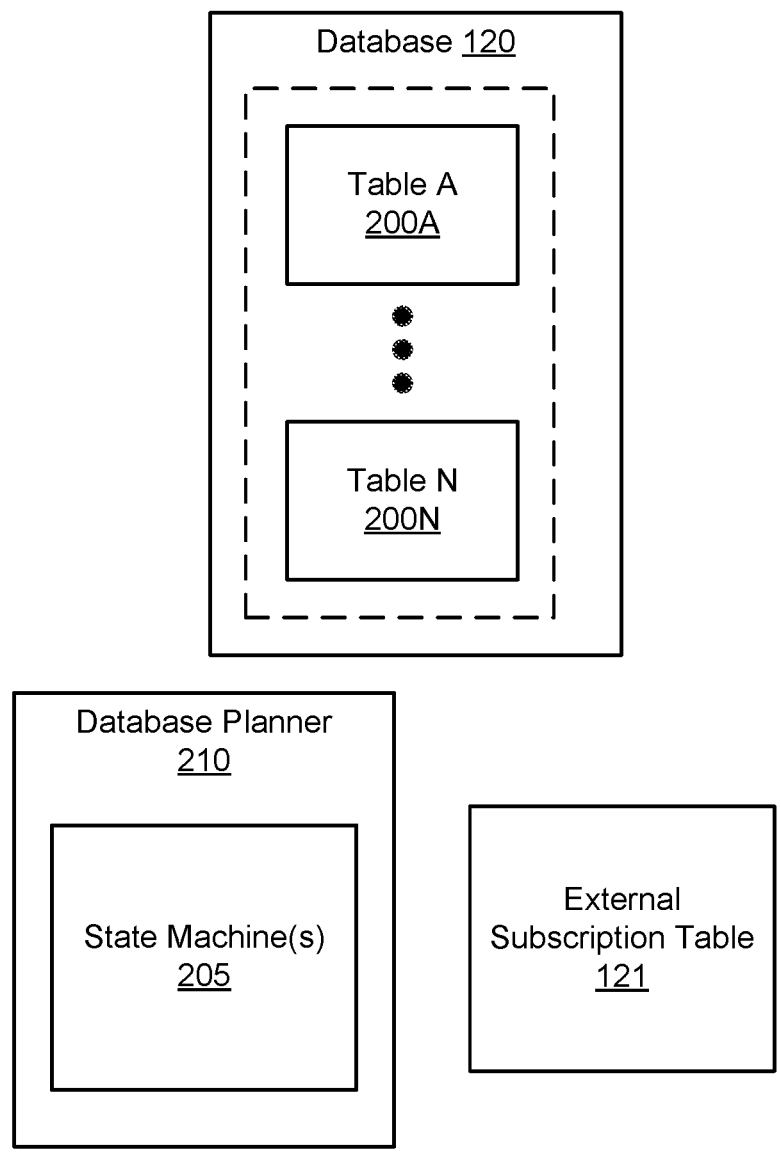
FIG. 2 shows a database in accordance with one or more embodiments of the invention.

In one or more embodiments of the invention, the database (120) may include one more tables (200A-200N) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

Figure 5:
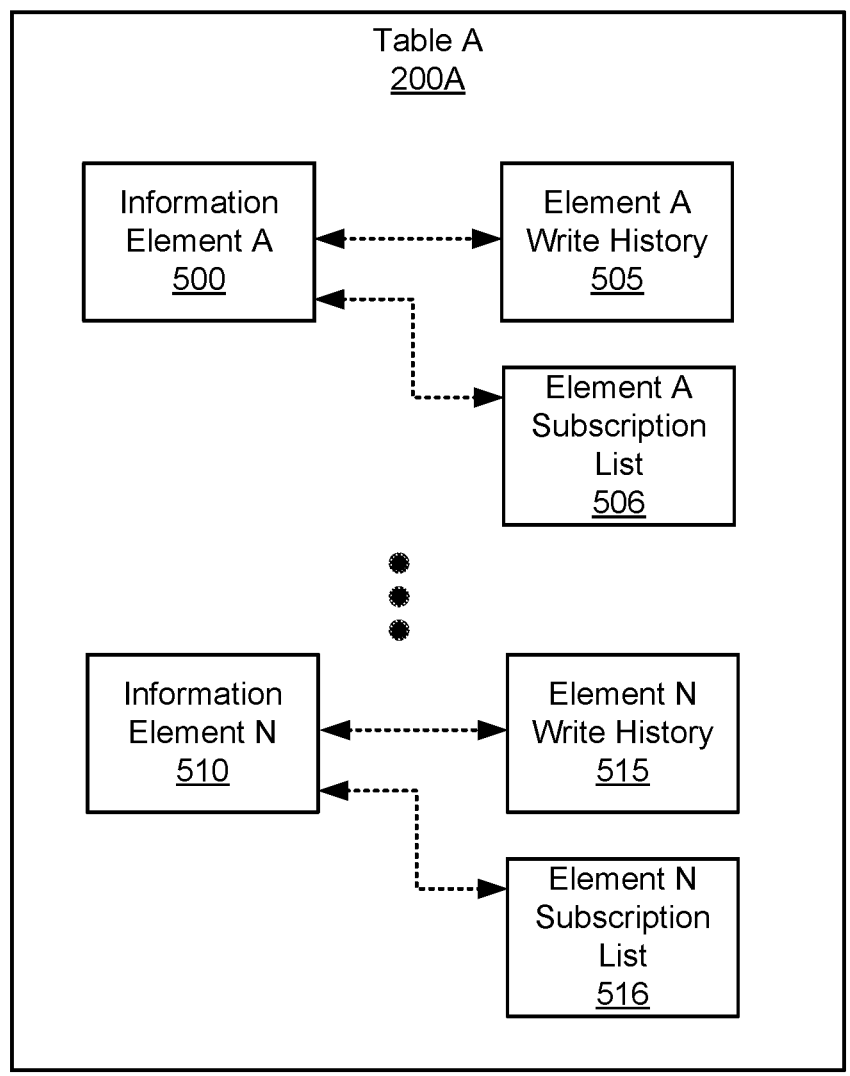
FIG. 5 shows a table of a database in accordance with one or more embodiments of the invention.

FIG. 5 shows an example of Table A (200A) in accordance with one or more embodiments of the invention. Table A (200A) includes a number of information elements (500, 510). As discussed above, each information element may include data of varying type.

In one or more embodiments of the invention, the database (120) may include a write history associated with each information element of each table of the database (120). The write history of an information element of a table may include a list of modifications, e.g., writes, to the element and the time of each modification. The list of modifications may include all of the modifications or a portion of the modifications. For example, information element A (500) may have an associated element A write history (505) that includes one or more modifications that have been made in a sequence to information element A (500). While the element A write history (505) is shown as being a part of Table A (200A) in FIG. 5, the write history of each information element of each table may be stored in other locations without departing from the invention.

In one or more embodiments of the invention, the database (120) may include a subscription list (506) associated with each information element of each table of the database (120). The subscription list (506) associated with each element may be a list of observers and/or modifiers, registered with the database, that interact with the associated information element. When an information element is updated, e.g., written to an information element by a modifier, the database may notify each entity listed in the subscription list (506) associated with the information element that the information element was updated.

In one or more embodiments of the invention, each subscription list associated with each information element of the database (120) may include a history list position of each observer. Observers may read information from the database at predetermined times, periodically, and/or in real-time in response to notifications of updates to information from the database (120). When an observer requests to read information from an information element of the database (120), the database (120) may return one or more modifications listed in the write history list, associated with the information element, having a write time that is later than a write time of the history list position. By sending one or more of the modifications having a write time that is later than the write time of the history list position, information written to the information element may be provided to the observer and thereby propagated to any requesting entities. The database (120) may update the history list position of the observer as the observer reads modifications from the history list.

In one or more embodiments of the invention, when an observer requests to read information from an information element of the database (120), the database (120) may continue to return modifications until the history list position of the observer is updated to the most recent modification.

In an example, information element A (500) may have an associated element A subscription list (506) and information element N (510) may have an associated element N subscription list (516). Each of the subscription lists (506, 516) may include a listing of observers that are observing information elements A (500) and N (510), respectively. Each of the subscription lists (506, 516) may also include the history list position of each observer with respect to element A write history (505) and element N write history (515). The history list position of each observer with respect to each write history may be different, e.g., a first observer may have a history list position that is at a later time than a history list position of a second observer that is observing the same information element as the first observer. Thus, each information element may have a different subscription list and each entity listed in the subscription list may have a different history list location.

In one or more embodiments of the invention, the database (120) may remove elements of a write history of an information element when all of the entities subscribed to the information element have read the element. Removing the elements of the write history that have been read by all subscribed entities may reduce the storage requirements of the database.

While the element A subscription list (506) and element N subscription list (516) are shown as being a part of Table A (200A) in FIG. 5, the subscription list associated with each information element of each table may be stored in other locations without departing from the invention.

Figure 3:
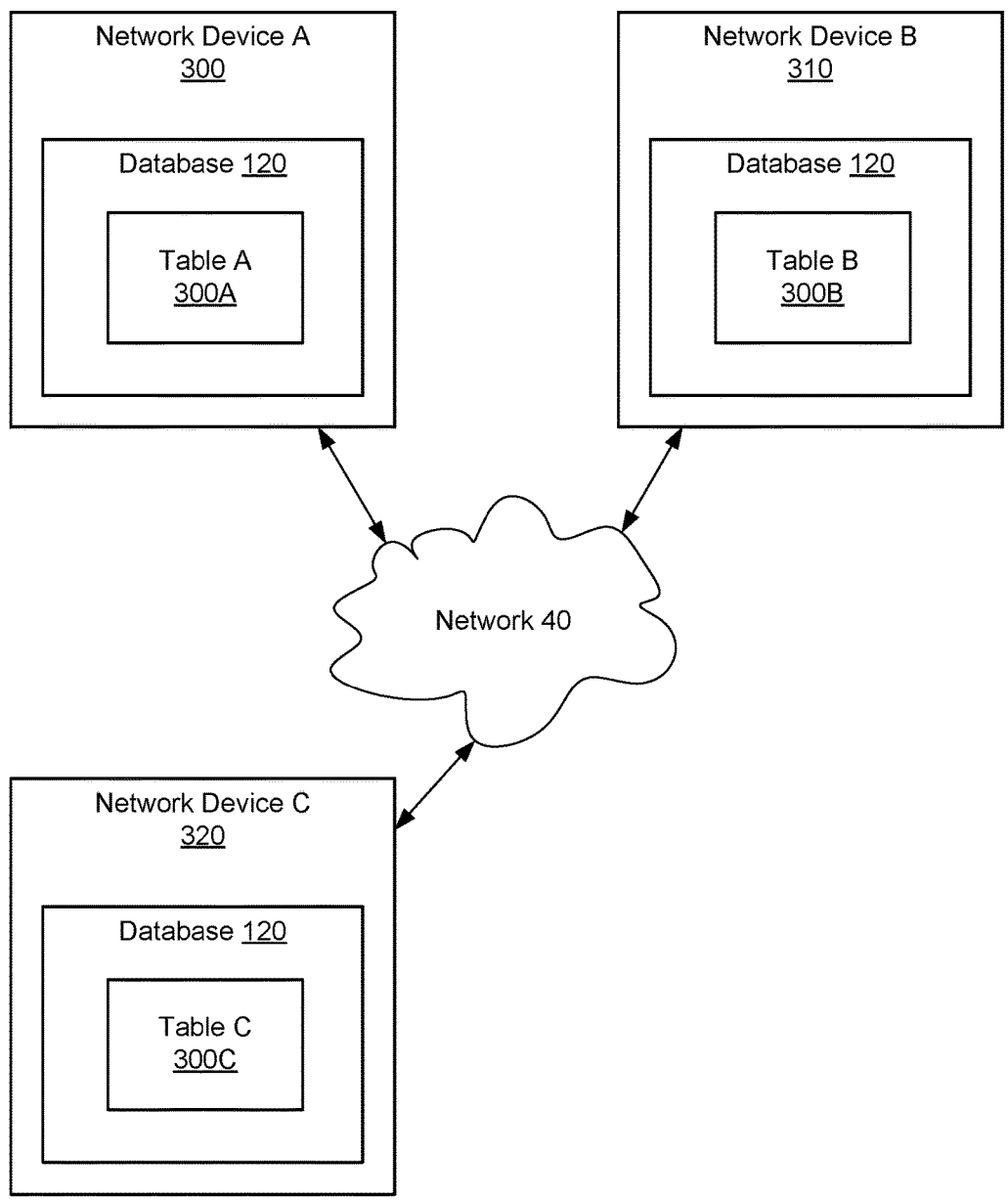
FIG. 3 shows a diagram of a database distributed across multiple network devices in accordance with one or more embodiments of the invention.
Figure 4:
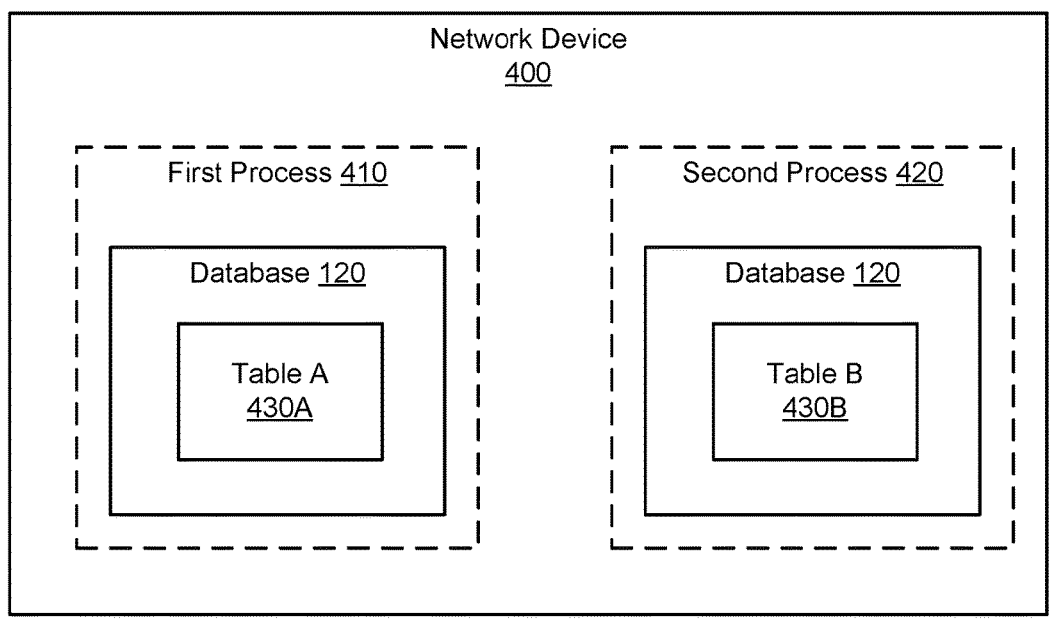
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, 300C) may include duplicate and non-duplicate information.

For example, each of the tables (300A, 300B, 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the network device may include a database planner (210). The database planner (210) may manage the database (120). Managing the database (120) may comprise maintaining the location of each table of the database and facilitating inter network device and/or inter process memory transfers between tables of the database. For example, an agent present on a first network device may request to read data from a table that is present on a second network device. In response to the request from the agent, the database planner (210) may provide the location of the table on the second network device and thereby enable the agent to retrieve the data from the second table. In one or more embodiments of the invention, the database planner (210) may generate an observer, in response to requests from entities. The generated observer may retrieve data from a table of the database and provide the data to the requesting entity as describe with respect to FIG. 5. In some embodiments of the invention, managing the database (120) may include maintaining the location of each table of the database across shared memory.

In one or more embodiments of the invention, the database planner (210) may include a data structure, e.g., a list, tree, or other structure, that includes the location of each unique entry of the database (120). A unique entry may be an entry of a table where information is first written into the database (210). The information may be subsequently written to other entries of other tables of the database as duplicative information. The data structure may include the information necessary to determine the location of each unique entry of the database (120) and thereby enable data included in any entry of the database (120) to be retrieved and or duplicated to other tables of the database (120). In one or more embodiments of the invention, the database (120) may present requesting entities with information relating to materialized entries of the database. In one or more embodiments of the invention, the database (120) may not present requesting entities with information relating to non-materialized entries of the database.

In one or more embodiments of the invention, the database planner (210) may be executing on the network device and include functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

In one or more embodiments of the invention, the network device (100) may include one or more state machine(s) (205). The state machine(s) (205) may be programs executing on the network device or a network device linked to the network device.

The state machine(s) (205) may be programmed to monitor and/or modify one or more entries of the database (120) and notify entities that are subscribed to the entries of the database of changes to the entries of the database (120). Subscriptions to entries of the database (120) may be listed in one or more tables of the database.

For example, the database may include a SQI subscription table. The table may include entries that specify a number of entities that wish to be notified of output generated by a SQI. When output is generated by the SQI, the state machines(s) (205) may propagate the output to any entity listed in the SQI subscription table.

In a second example, the database may include a write subscription table. The write subscription table may include entries that specify an entry of a database and an entity that requests to write to that entry of the database. When data is received from the entity that requests to write to that entry of the database, the state machine(s) (205) may propagate the output to any entity listed in the write subscription table.

Thus, the database planner (210) and state machine(s) (205) may enable the database (120) to provide information to an agent or other entity of the location of any entry of any table and/or SQI of the database (120).

Returning to FIG. 1B, in one or more embodiments of the invention, the QSM (110) may include functionality to manage QSs. The QSM manager (110) may manage one or more QSs (111A-111M).

Managing QSs may include generating QSIs in response to requests from agents (130), generating observers associated with instances of the QSs (111A-111M), and/or generating modifiers associated with the instances of the QSs (111A-111M). The QSM (110) may generate instances of QSs (111A-111M), observers, and modifiers based on information stored in or derived from the database (120) and/or a database planner (210, FIG. 2). Methods of managing QSIs are further described with respect to FIGS. 8A and 8C-8E and QSIs are further described with respect to FIGS. 6-7.

In one or more embodiments of the invention, the QSM (110) may be an embedded hardware device. The embedded hardware device may be, for example, a field programmable gate array (FPGA), application specific integrated circuit (ASIC), and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or more embodiments, the QSM (110) may comprise instructions, stored on a non-transitory computer readable storage medium, that when executed on a processor of the network device (100) cause the network device (100) to perform the functionality of the QSM (110). In one or more embodiments of the invention, the QSM (110) may be executed by processors of external entities (140) and cause the network device (100) to perform the functionality of the QSM (110) by remotely communicating with the network device (100) by an operable connection.

Figure 6:
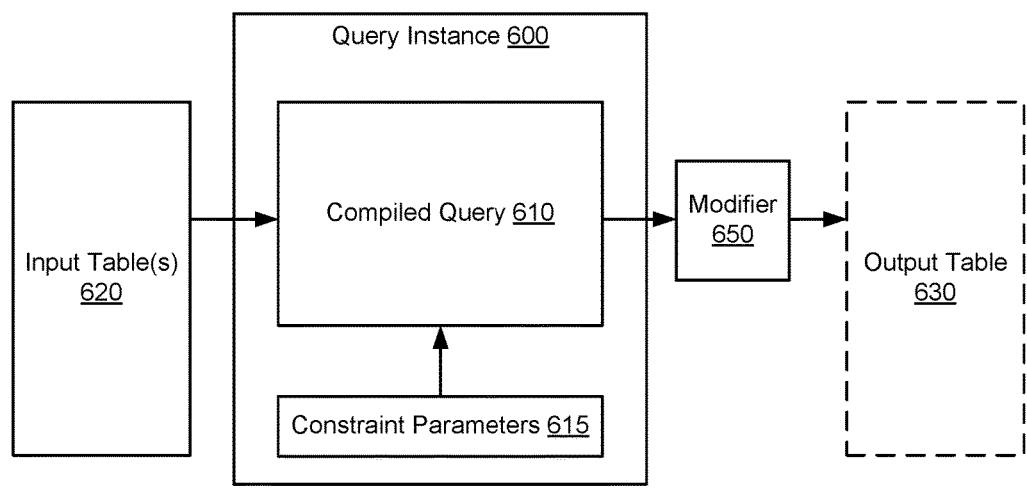
FIG. 6 shows a diagram of a standing query instance (SQI) including a materialized output in accordance with one or more embodiments of the invention.

Each of the QSs (111A-111M) may include one or more instances of a QS. An example of a query instance (QI) (600) in accordance with one or more embodiments of the invention is shown in FIG. 6. The QI (600) includes a compiled query (610) and one or more constraint parameters (615). Each of the components of the example QI (600) is described below.

The QI (600) may include a compiled query (610). The compiled query (610) may include instructions that, when executed by a processor, generate an output based on information included in an input table(s) (620) associated with the QI (600) and constraint parameters (615) of the QI (600). In one or more embodiments of the invention, the compiled query (610) may generate output in response to a change in value of one or more entries of the input table(s) (620). In one or more embodiments of the invention, the compiled query (610) may generate output at predetermined times. In one or more embodiments of the invention, the predetermined times may be periodic, e.g., the compiled query (610) may generate an output every five seconds.

The constraint parameters (615) may modify the manner in which the compiled query (610) generates an output, e.g., scales output, excludes input used to determined output, modifies weight of an input, etc.

The input table(s) (620) may be a data structure including one or more elements. The elements of the input table(s) (620) may be generated by one or more observers, as will be discussed in greater detail with respect to FIGS. 6 and 7.

Output generated by the compiled query (610) may be sent to a modifier (650) associated with the QI (600). The modifier (650) may propagate the output of the compiled query (610) to the output table (630) associated with the QI (600). The output table (630) will be discussed in greater detail with respect to FIGS. 6 and 7.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the QSM (110) of the network device (100). In an example, an agent (130) may determine information derived from information stored in the database (120). To determine the information, the agent (130) may send a request for a new SQI to the QSM (110) to determine the derived information. The QSM (110) may generate a new SQI in response to the request and one or more observers to propagate information generated by the new SQI to the agent (130). The QSM (110) may generate a compiled query of the new SQI in accordance with the indicator the type of the requested query.

When agents (130), executing on the network device (100) or another network device connected to the network device (130), wish to interact with the database (120), the agents must first connect with and/or register with the database (120). Registering with the database (120) may require specifically crafted interfacing, e.g., binding and linking.

To reduce the complexity of interacting with the database (120), the network device (100) may include an external subscription list (121). The external subscription list (121) may be a table of entries. Each entry may specify one or more entries of the database, a type of action, and one or more requesting entities. Entities that wish to interact with entries of the database and/or SQIs may write a row to the external subscription list (121).

When an agent (130) first connects with the database, the database may send a database planner to the agent (130). Sending the database planner to the agent may enable the agent to determine the contents of the database, e.g., data stored and/or SQIs executing. In one or more embodiments of the invention, the database may send one or more rows that specify the contents of the database. Thus, when writing a row to the external subscription list (121), the agent may be able to specify any desired data/SQIs of the database.

The network device may include an interpreter (125) that may read rows of the external subscription list (121). The interpreter (125) may be programmed to generate entities based on the rows of the external subscription list (125) based on the type of action specified in the entry of the external subscription list (125). In one or more embodiments of the invention, the interpreter (125) may generate QSI, observers, and/or modifiers to meet the needs of the entities listed in the external subscription list (125). The interpreter (125) may also generate entries of other subscription lists as necessary to propagate information to/from the entities specified by the rows of the external subscription list (121).

Figure 8A:
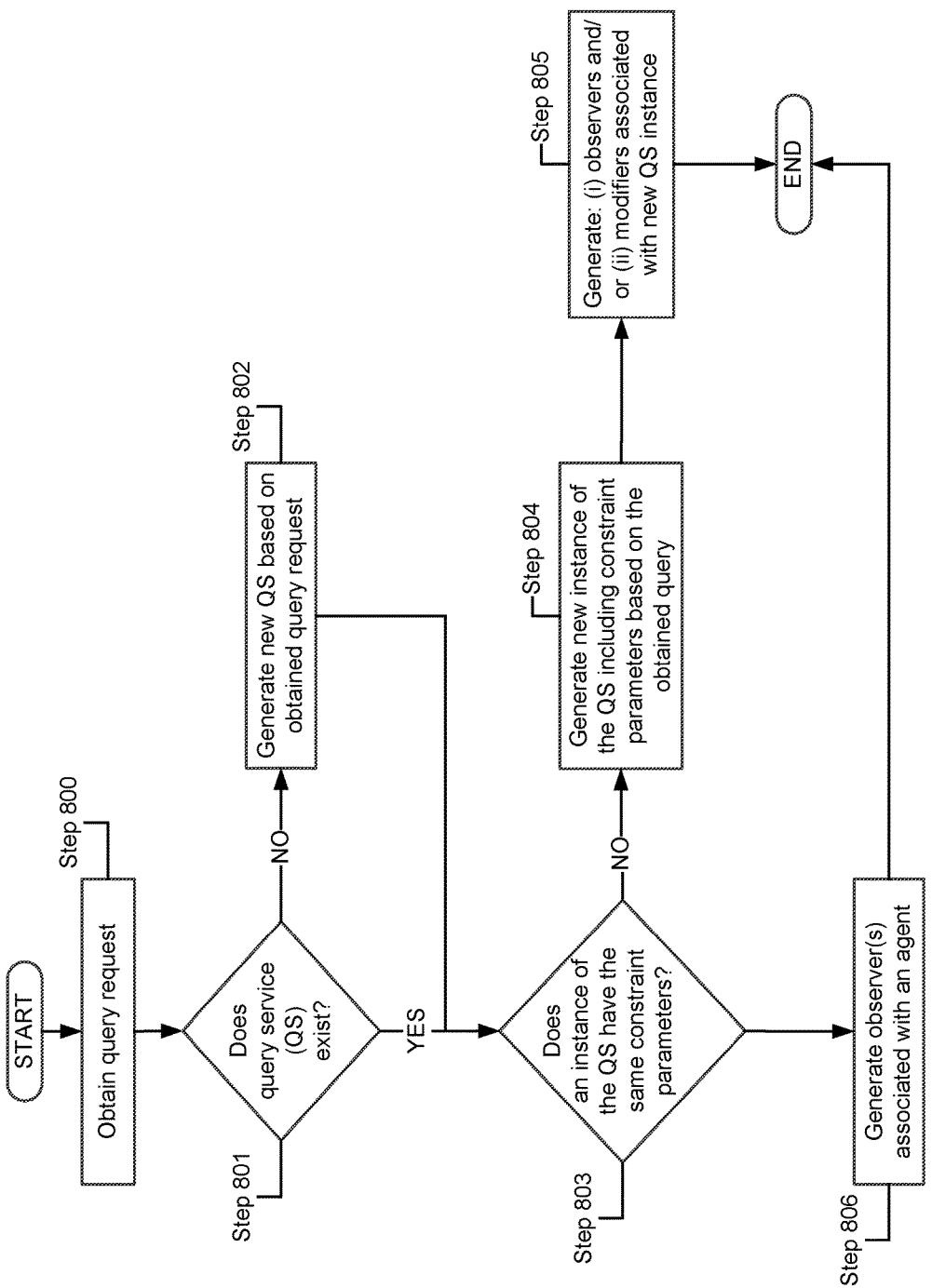
FIG. 8A shows a flowchart of a method of generating a SQI in accordance with one or more embodiments of the invention.
Figure 8B:
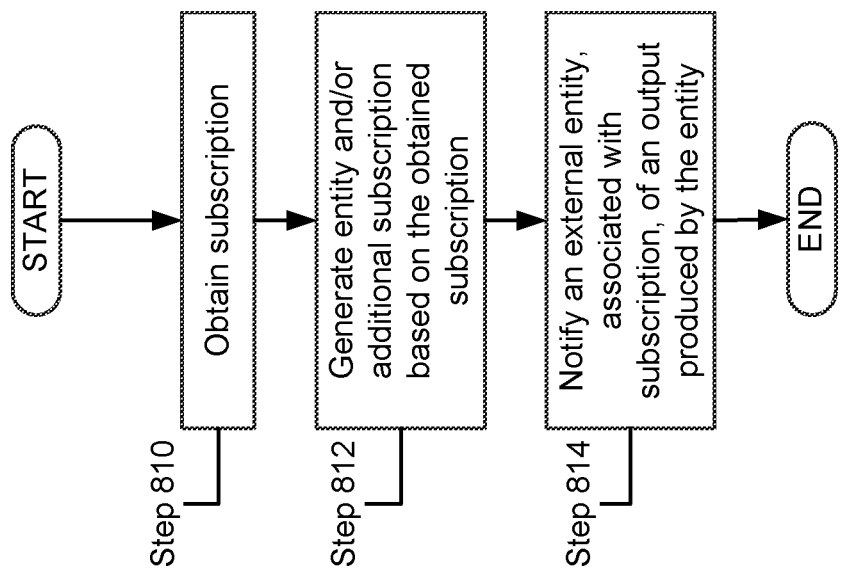
FIG. 8B shows a flowchart of a method of operating an interpreter in accordance with one or more embodiments of the invention.

Methods of connecting to the database, writing to the external subscription list, and receiving information from the database by utilizing the external subscription list (121) are further described with respect to FIG. 8B.

When an entity writes an entry to the external subscription list that specifies one or more entries of the table, the entity may prepare a local copy having an equal number of entries and thereby store entries of the database that are received from a state machine in response to the addition of the row to the external subscription list.

Figure 7:
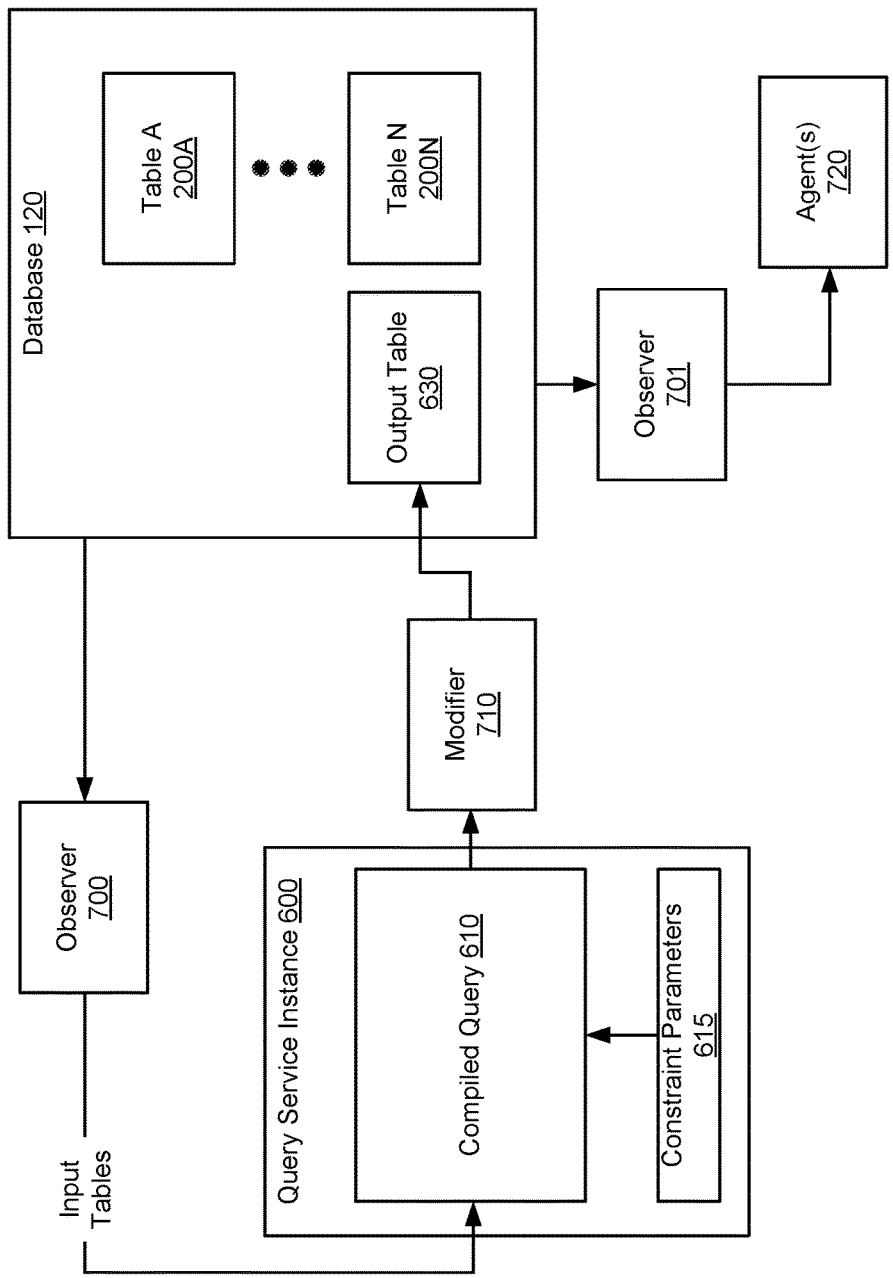
FIG. 7 shows a diagram of a standing query including a materialized output interacting with a database in accordance with one or more embodiments of the invention.

FIG. 7 shows the example of the query instance (QI) (600), shown in FIG. 6, interacting with a database (120) in accordance with one or more embodiments of the invention. In the example shown in FIG. 7, the QI (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610).

A second observer (701) was generated to read output, generated by the compiled query (610), stored in the output table (630) associated with the QI (600) and supply the output to the agent (720) requested the QI (600).

A modifier (710) was generated to propagate output generated by the compiled query (610) to the output table (630). While the output table (630) is shown as a separate table in FIG. 7, the output table (630) may be a portion of any table of the database (120) without departing from the invention.

Thus, as shown in FIG. 7, QSIs interacting with the database (120) read/write information to/from the database by observers and modifiers. Similarly, agents interacting with the database (120) also read/write information to/from the database by observers and modifiers.

FIG. 8A shows a flowchart in accordance with one or more embodiments of the invention. The method depicted in FIG. 8A may be used to generate QIs in response to requests from entities such as, for example, agents in accordance with one or more embodiments of the invention. One or more steps shown in FIG. 8A may be omitted, repeated, and/or performed in a different order among different embodiments.

In Step 800, a QSM of a network device obtains a request for a new instance of a query service. The QSM may obtain the request from a message from an agent. The agent may be executing on the network device on which the QSM is executing. The request may include a query type, one or more constraint parameters, whether the compiled query is to be standing or one-shot, and information stored in a database on which the new QSI is to operate.

In Step 801, the QSM determines whether a QS matching the query type included in the request exists on the network device. A QS may be determined as matching a QS if both the query type and whether the query is standing or one-shot, specified in the request obtained in Step 800, match a QS existing on the network device. If the query type does not match an existing QS, the method proceeds to Step 804. If the query type does match an existing QS, the method proceeds to Step 806.

In Step 802, the QSM generates a new QS based on the obtained query request. Specifically, the QSM may generate a new QS including the query type indicated in the obtained query request.

In one or more embodiments of the invention, generating a new QS may include compiling a query, e.g., generating a compiled query. In one or more embodiments of the invention, generating a new QS may include linking compiled byte code. In one or more embodiments of the invention, the newly compiled query may be generated as either a standing or one-shot depending on the request.

In Step 803, the QSM determines whether the constraint parameters of a QSI existing on the network device match the constraint parameters included in the obtained request. If the constraint parameters of the obtained request do not match the constraint parameters of an existing QSI, the method proceeds to Step 808. If the constraint parameters of the obtained request do match the constraint parameters of an existing instance of a QS, the method proceeds to Step 806.

In Step 804, the QSM generates a new QSI of the QS, corresponding to the query type included in the obtained request, including constraint parameters based on the constraint parameters included in the obtained request. Specifically, the QSM may make a copy the compiled query associated with the QS corresponding to the query type included in the obtained request and constrain the compiled query based on the constraint parameters included in the obtained request. The compiled query may be programmed as either standing or one-shot depending, depending on request.

In one or more embodiments of the invention, the constraint parameters change the behavior of the compiled query. The constraint parameters may be variables, utilized by the compiled query, which change the output produced by the compiled query when operating on the same input.

In Step 805, the QSM generates observers and/or modifiers associated with the new QSI. The QSM may generate one or more observers associated with the new QSI that supplies the compiled query of the new QSI with data on which the compiled query operates. The observers may supply the data to an input table of the new QSI as shown, for example, in FIG. 7. The QSM may also generate one or more modifiers associated with the QSI that propagates output generated by the compiled query of the QSI. The modifiers may propagate the output generated by the compiled query to an output table associated with the new QSI.

In one or more embodiments of the invention, the QSM may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the QSI requested by the agent.

Returning to Step 803, the method may proceed to Step 806 if an existing QSI includes constraint parameters that are the same as those included in the query request obtained in Step 800.

In Step 806, the QSM generates observer(s) associated with an agent from which the new QSI request was obtained in Step 800. The observer may be linked with the output table where data generated by the existing QSI identified in Step 806 is stored and the agent from which the request was obtained in Step 800. The observer may propagate changes to the output table to the agent and thereby notify the agent of new output generated by the existing QSI. In other words, if an existing QSI includes the same constraint parameters as those of the request, an observer may be generated to propagate results of the existing QSI to the agent rather than generating a new QSI and a new modifier.

In one or more embodiments of the invention, the observer may propagate changes to the output table to an agent in response to a notification from the database that the element of the database the observer is observing, e.g., one or more elements of the output table, have changed.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the query request was obtained in Step 800. In one or more embodiments of the invention, the predetermined times may be intermittent. In one or more embodiments of the invention, the predetermined times may be periodic, e.g., every 5 seconds.

Thus, the methods shown in FIG. 8A may be used to generate observers, modifiers, and QSIs in response to requests from agents.

FIG. 8B shows a flowchart in accordance with one or more embodiments of the invention. The method depicted in FIG. 8B may be used by an interpreter to generate one or more entities in accordance with one or more embodiments of the invention. One or more steps shown in FIG. 8B may be omitted, repeated, and/or performed in a different order among different embodiments.

In Step 810, an interpreter of a network device may obtain a subscription. The interpreter may obtain the subscription from an external subscription list. The subscription may specify one or more entries of the database, a type of action, and/or a requesting entity. In one or more embodiments of the invention, the type of action may be a read, sequential read, write, and/or deletion.

In Step 812, the interpreter may generate an entity and/or additional subscription based on the subscription. In one or more embodiments of the invention, the interpreter may generate the entity and/or additional subscription based on the type of action specified in the subscription.

In one or more embodiments of the invention, the interpreter may generate a SQI when the type of action is a read request. The interpreter may generate an input table of the SQI based on one or more entries of the database specified in the read request. The newly generated SQI may produce an output that is identical to the entries of the database specified in the read request. The output may be stored in an output table entry of the database. The interpreter may write a row to a read subscription table of the database specifying the output table entry of the database.

As will be discussed in greater detail with respect to FIG. 10, one or more state machines of the database may propagate any changes to any entry of the database, e.g., the entry of the output table, listed in the read subscription table to any entity listed in the read subscription table. In other words, the interpreter may subscribe the requesting entity listed in the external subscription table to the output table of the generated SQI. One or more state machines may propagate the output of the SQI to the requesting entity due to the subscription.

In Step 814, the interpreter may notify the entity associated with the subscription of the output generated by the SQI. The interpreter may notify the entity associated with the subscription by writing a row to a publication table of the database and subscribing the entity associated with the subscription to the entry of the publication table. In other words, the interpreter may subscribe the requesting entity listed in the external subscription table to the written row of the publication table. One or more state machines may propagate the written row of the publication table to the requesting entity due the subscription.

The method may end following Step 814.

Figures 8C, 8D:
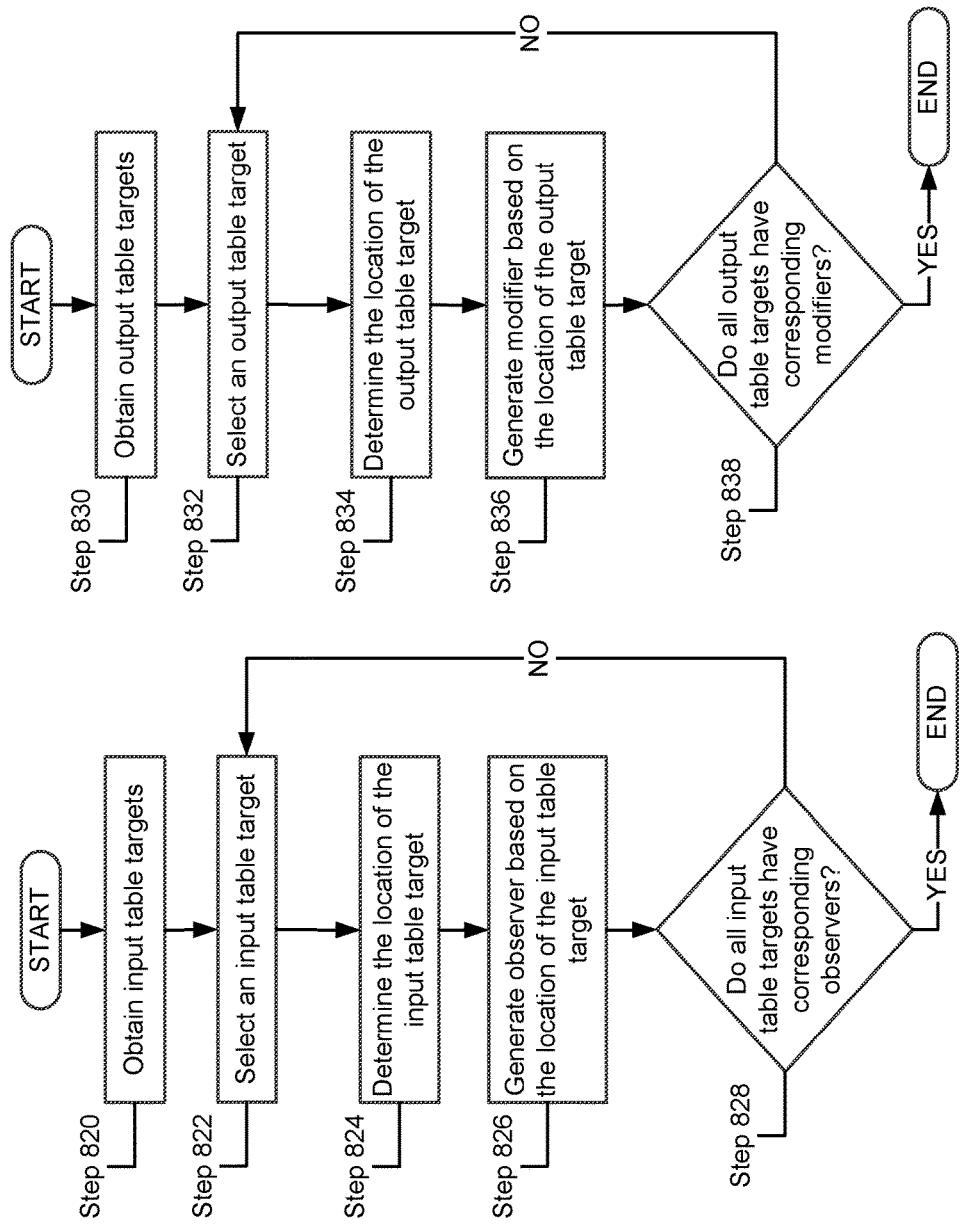
FIG. 8C shows a flowchart of a method of generating observers in accordance with one or more embodiments of the invention.
FIG. 8D shows a flowchart of a method of generating modifiers in accordance with one or more embodiments of the invention.

FIG. 8C shows a flowchart in accordance with one or more embodiments of the invention. The method depicted in FIG. 8C may be used to generate observers in response to requests for QSIs from agents in accordance with one or more embodiments of the invention. One or more steps shown in FIG. 8C may be omitted, repeated, and/or performed in a different order among different embodiments.

In Step 820, a QSM of a network device obtains one or more input table targets. The input table targets may be one or more elements of a database on which a requested QSI is to operate. The input table targets may be obtained from a request from an agent requesting the QSI.

In Step 822, the QSM selects one of the input table targets.

In Step 824, the QSM determines the location of the input table target selected in Step 822. The QSM may determine the location of the input table by target by requesting the location from a database planner (210, FIG. 2) that manages the database (120, FIG. 2). The location of the input table target may be an entry of a table of the database (120, FIG. 2).

In Step 826, the QSM generates an observer based on the location of the input table target. The location of the input table target may be located in the same address space as the input table of the QSI, located in a different address space than the input table of the QSI, or located in a different address space of a different network device than the input table of the QSI. The QSM may generate observers linked to memory transport protocols and/or inter-device memory transport protocols to facilitate propagating information from the database to the input table of a QSI.

For example, if an input table is located in a different address space than the input table of the QSI, the QSM may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the QSM may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the QSM determines whether all input table targets are observed by observers. If all input table targets are observed by observers, the method may end. If all input table targets are not observed by observers, the method may proceed to Step 822.

Thus, the method shown in FIG. 8C may be used to generate observers to propagate changes to input table targets located in a database to an input table of a QSI.

While the method shown in FIG. 8C is illustrated as generating unique observers for each input table target, one of ordinary skill in the art will appreciate that the method may be implements by utilizing a single observer that observes multiple input table without departing from the invention.

FIG. 8D shows a flowchart in accordance with one or more embodiments of the invention. The method depicted in FIG. 8D may be used to generate modifiers in response to requests for QSIs from agents in accordance with one or more embodiments of the invention. One or more steps shown in FIG. 8D may be omitted, repeated, and/or performed in a different order among different embodiments.

In Step 830, a QSM of a network device obtains one or more output table targets. The output table targets may be one or more elements of a database on which a requested QSI is to propagate its output. The output table targets may be obtained from a request from an agent requesting the QSI.

In Step 832, the QSM selects one of the output table targets.

In Step 834, the QSM determines the location of the output table target selected in Step 832. The QSM may determine the location of the output table target by requesting the location from a database planner (210, FIG. 2) that manages the database (120, FIG. 2). The location of the output table target may be an element of a table of the database (120, FIG. 2).

In Step 836, the QSM generates a modifier based on the location of the output table target. The modifier may write data received from the QSI to the location of the output table target, e.g., one or more elements of a table of the database.

In Step 838, the QSM determines whether all output table targets have associated modifiers. If all output table targets have associated modifiers, the method may end. If all output table targets do not have associated modifiers, the method may proceed to Step 832.

Thus, the method shown in FIG. 8D may be used to generate modifiers to propagate output generated by the QSI to an output table of a database.

While the method shown in FIG. 8D is illustrated as generating unique modifiers for each output table target, one of ordinary skill in the art will appreciate that the method may be implemented by utilizing a single modifier associated with all of the output table targets without departing from the invention.

As discussed with respect to FIGS. 8C and 8D, observers and modifiers may be employed to read and/or write data to and/or from a database by a QSI. Similarly, observers and modifiers may be employed to read and/or write data to and/or from a database by an agent.

FIG. 8E shows a flowchart in accordance with one or more embodiments of the invention. The method depicted in FIG. 8E may be used to generate observers in response to requests to read data from a database by an agent in accordance with one or more embodiments of the invention. One or more steps shown in FIG. 8E may be omitted, repeated, and/or performed in a different order among different embodiments.

In Step 840, a database may obtain one or more observer targets. The database may obtain the observer targets based on a request from an agent. The request may include one or more elements of the database.

In Step 842, the database may determine the location of the observer targets. The database may determine the location of the observer targets by requesting the location of each observer target from a database planner (210, FIG. 2).

In Step 844, the database may generate one or more observers based on the location of the observed targets. As described with respect to FIG. 8B, multiple observers and/or memory transport may be used to propagate information from the observed targets of the database to the agent that requests the targets be observed in Step 840.

FIG. 8F shows a flowchart in accordance with one or more embodiments of the invention. The method depicted in FIG. 8F may be used to generate modifiers in response to requests to write data to a database by an agent in accordance with one or more embodiments of the invention. One or more steps shown in FIG. 8F may be omitted, repeated, and/or performed in a different order among different embodiments.

In Step 850, a database may obtain one or more modifier targets. The database may obtain the modifier targets based on a request from an agent. The request may include one or more elements of the database.

In Step 842, the database may determine the location of the modifier targets. The database may determine the location of the modifier targets by requesting the location of each modifier target from a database planner (210, FIG. 2).

In Step 844, the database may generate one or more modifiers based on the location of the modifier targets.

Figure 9A:
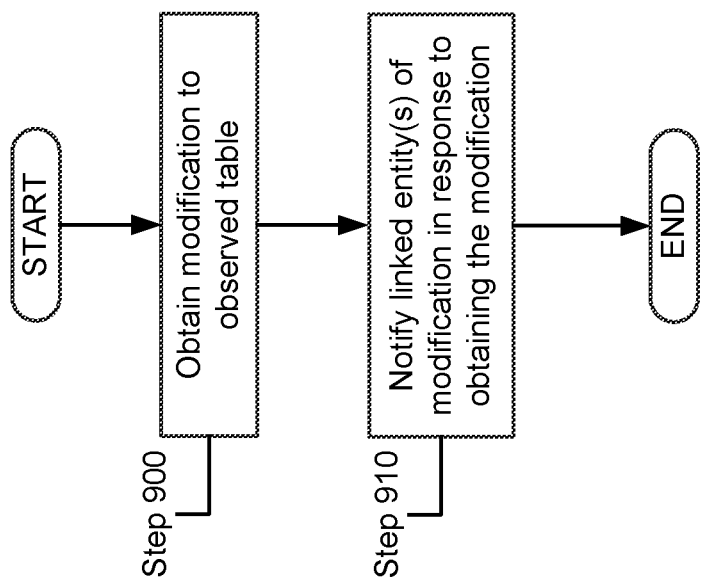
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification.

In Step 910, the observer may notify any linked entities of the modifications obtained in Step 900. As described with respect to FIGS. 7 and 8, an observer may be linked to one or more entities. The entities may be input tables of QSIs, agents, or any other consumer of information. The observer may notify each linked entity of the modification of the element of the database the observer is observer is observing.

In one or more embodiments of the invention, the modification may be the addition of a query completion indicator. An entity that receives a query completion indicator from an observer may be programmed to interpret the query completion indicator to mean that a one-shot QSI, that generates the output observed by the observer, has generated a complete output.

Figure 9B:
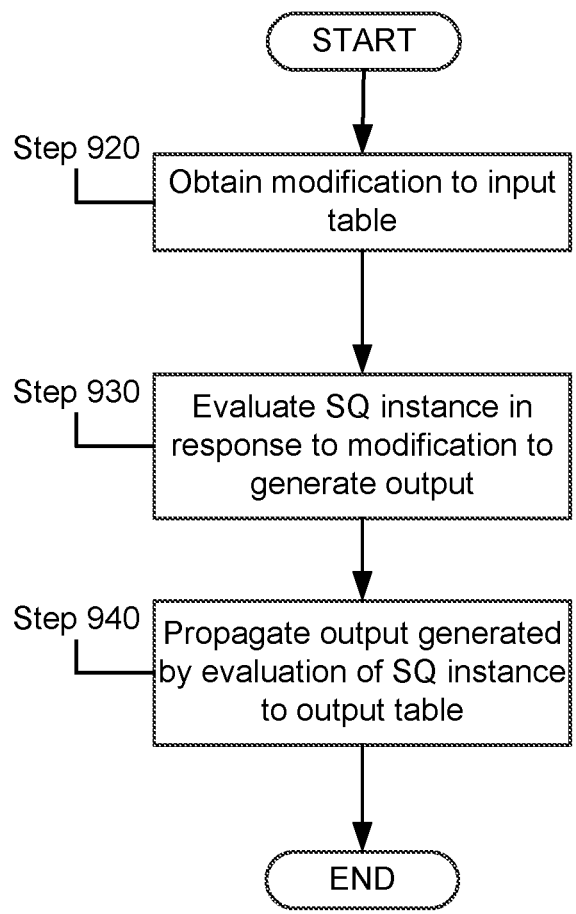
FIG. 9B shows a flowchart of a method of evaluating a standing query instance (SQI) in accordance with one or more embodiments of the invention.

FIG. 9B shows a flowchart in accordance with one or more embodiments of the invention. The method depicted in FIG. 9B may be used by a QSI to evaluate a SQ in accordance with one or more embodiments of the invention. One or more steps shown in FIG. 9B may be omitted, repeated, and/or performed in a different order among different embodiments.

In Step 920, a QSI may obtain a modification to an input table. The modification may be obtained by an observer performing the method shown in FIG. 9A.

In Step 930, the QSI may execute the compiled query of the SQ in response to the modification. Executing the compiled query may generate output.

In Step 940, the QSI may propagate output generated by evaluation of the QSI to an output table. The output generated by the QSI may be propagated to an output table by the method shown in FIG. 9C.

Figure 9C:
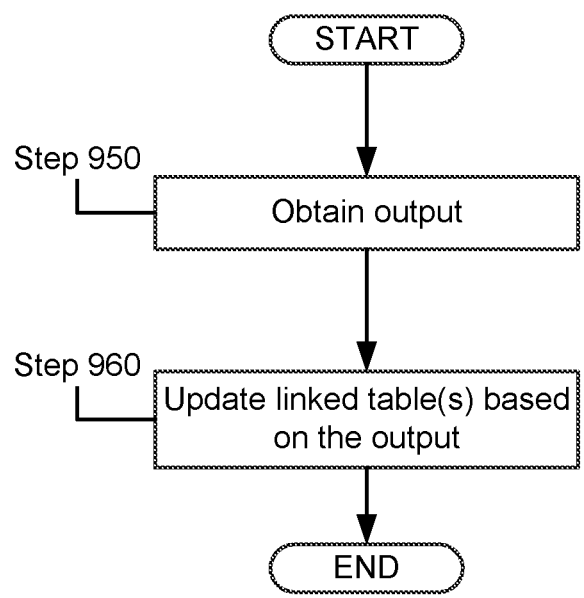
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a QSI, an agent, or any other entity.

In Step 960, the modifier updates one or more linked tables based on the obtained output.

Figure 10:
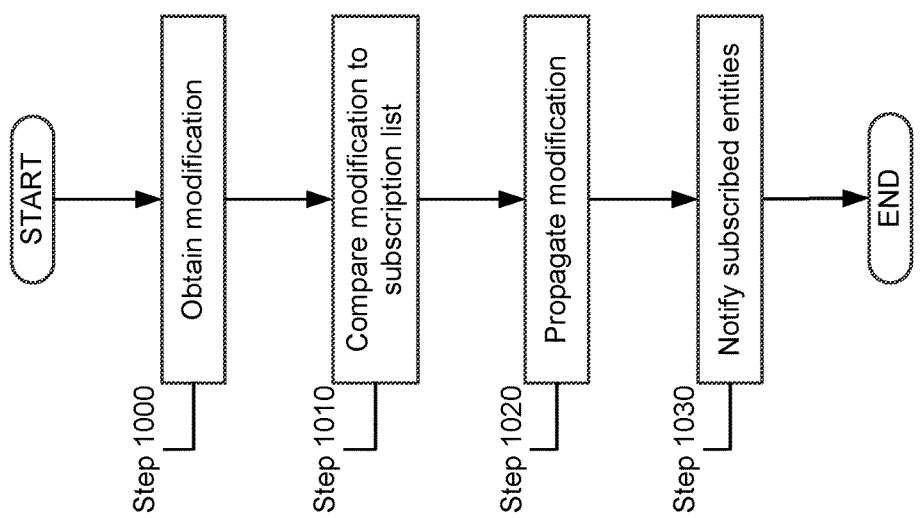
FIG. 10 shows a flowchart of a method of operating a state machine in accordance with one or more embodiments of the invention.

FIG. 10 shows a flowchart in accordance with one or more embodiments of the invention. The method depicted in FIG. 10 may be used by a state machine of a network device in accordance with one or more embodiments of the invention. One or more steps shown in FIG. 10 may be omitted, repeated, and/or performed in a different order among different embodiments.

In Step 1000, a state machine obtains a modification. The modification may be a modification to a table of the database. The modification may specify a change to an entry of the database and an entity that requests the change.

In Step 1010, the state machine compares the requesting entity to a subscription list. The subscription list may be a write subscription list. The subscription list may specify entries of the database based on the requesting entity.

In Step 1020, the state machine may propagate the modification to the entry of the database specified in the subscription list. The state machine may propagate the modification by, for example, writing the modification to the entry of the database.

In Step 1030, the state machine may notify entities that are subscribed to the entries of the database to which the modification was propagated. The state machine may notify the entities by identifying any entities associated with any entries of a read subscription list that specifies the entries of the database to which the modification was propagated. Once identified, the state machine may forward the modified contents of the entries of the database to which the modification was propagated to the identified entities.

Thus, the state machines, as described above, may propagate changes to the database based on subscription tables.

One or more embodiments of the invention may enable one or more of the following: i) reading/writing data to a database by an external entity by writing a single row, ii) maintaining a uniform method of reading/writing data to a database by an internal or external entity, and iii) reduced signaling overhead by eliminating handshakes associated with internal entities.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
   a processor;
   a memory operatively connected to the processor;
   a storage device operatively connected to the processor and the memory and comprising an external subscription table comprising a subscription associated with a client and with an information element, wherein the information element is also associated with a write history comprising a plurality of modifications to the information element, each modification comprising a timestamp;
   an interpreter executing on the processor and programmed to:
      obtain the subscription;
      generate an entity, based on the subscription, that produces an output comprising a subset of the plurality of modifications to the information element, the subset being only modifications with timestamps after a current history position for the entity for the information element;
      update the current history position of the entity for the information element to obtain a new history position;
      notify, after the entity has generated the output, the client of the output; and
   a state machine executing on the processor and programmed to send the output to the client based on the subscription.

2. The network device of claim 1, wherein the subscription specifies a table of a database.

3. The network device of claim 2, wherein the entity generates the output based on the table.

4. The network device of claim 2, wherein the subscription specifies data to be stored in the table.

5. The network device of claim 4, wherein the entity stores the data in the table.

6. The network device of claim 1, wherein the subscription specifies the client.

7. The network device of claim 1, wherein the interpreter notifies the client by storing a subscription notification in a publication table of the network device that is monitored by the client.

8. The network device of claim 1, further comprising:
   a database planner that specifies a location of an entry of a database,
   wherein the output is generated based on, at least in part, the database planner.

9. The network device of claim 8, wherein the state machine is further programmed to:
   send a copy of the database planner to any client associated with any entry of the external subscription table.

10. The network device of claim 9, wherein the subscription is based on, at least in part, an entry of the database planner.

11. The network device of claim 1, wherein the network device is one network device selected from a group of network devices consisting of a switch, a router, and a multilevel switch.

12. The network device of claim 1, wherein the client is a second network device.

13. The network device of claim 1, wherein the client is a program executing on the network device.

14. A method of operating a network device, comprising:
   obtaining, by an interpreter of the network device, a subscription associated with a client and with an information element, wherein the information element is also associated with a write history comprising a plurality of modifications to the information element, each modification comprising a timestamp;
   generating, by the interpreter, an entity that produces an output comprising a subset of the plurality of modifications to the information element, the subset being only modifications with timestamps after a current history position for the entity for the information element;
   updating the current history position of the entity for the information element to obtain a new history position; and
   sending, after the entity has generated the output and by a state machine of the network device, the output to the client based on the subscription.

15. The method of claim 14, wherein the output is based on an entry of a database of the network device.

16. The method of claim 15, further comprising:
   sending a copy of a database planner to the client,
   wherein the database planner specifies a location of an entry of the database.

17. The method of claim 16, wherein the subscription is based on, at least in part, the database planner.

18. A method of operating a client, comprising:
   establishing a connection with a network device;
   receiving a database planner in response to establishing the connection;
   sending a subscription request to the network device based on, at least in part, the database planner, wherein the subscription request specifies a table of a database of the network device;
   obtaining, in response to the subscription request, a subscription notification from the network device,
   generating, in response to the subscription notification, a table based on a type specified in the subscription notification, and
   receiving data from the network device by the connection, wherein the data comprises a write history of an information element, the write history comprising a plurality of modifications to the information element with timestamps after a current history position of an entity on the network device.

19. The method of claim 18, further comprising:
   populating the table based on the received data, wherein the subscription notification indicates that the subscription request was accepted.

20. The method of claim 18, further comprising:
   obtaining, in response to the subscription request, a subscription notification from the network device; and
   sending a second subscription request to the network device based on, at least in part, the database planner, wherein the subscription notification indicates that the subscription request was not accepted.

* * * * *